United States Patent [19]

Alien et al.

[11] 3,916,176

[45] Oct. 28, 1975

[54] METHOD FOR CLASSIFYING SUPPOSEDLY CANCEROUS CYTOLOGIC PREPARATIONS AND APPARATUS FOR IDENTIFYING SUPPOSEDLY CANCEROUS CYTOLOGIC PREPARATIONS EFFECTING THIS METHOD

[76] Inventors: Imant Karlovich Alien, ulitsa Raunas, 45, kv. 32; Grigory Petrovich Krupnikov, ulitsa Gorkogo, 123, kv. 25; Arkady Yakovlevich Khesin, ulitsa Suvorova, 16, kv. 18; David Moiseevich Bakhmutsky, ulitsa Sverdlova, 7, kv. 15; Velta Mikelevna Bramberga, ulitsa Gregora, 8, kv. 20; Mark Naumovich Libenson, ulitsa Sverdlova, 7, kv. 2; Jury Olegovich Popov, ulitsa Veidenbauma, 24, kv. 3; Vladislav Alexandrovich Sitovenko, ulitsa Radiostantsiyas, 5, kv. 2; Lev Isaakovich Stolov, ulitsa Daugavgrivas, 132/1, kv. 22; Boris Albertovich Yanson, ulitsa B.Altonovas, 8, kv. 1, all of Riga, U.S.S.R.

[22] Filed: Aug. 30, 1973

[21] Appl. No.: 393,051

[52] U.S. Cl........... 235/151.3; 128/2 R; 235/92 MT; 235/92 EV

[51] Int. Cl.$^2$........................ G06F 7/38; A61B 5/00

[58] Field of Search........ 235/151.3, 92 MT:92 EV, 235/92 CA; 128/2 R; 178/7.6

[56] References Cited

UNITED STATES PATENTS

| | | | |
|---|---|---|---|
| 3,706,877 | 12/1972 | Clifford, Jr. et al. | 235/151.35 |
| 3,742,196 | 6/1973 | Durkos et al. | 235/151.3 |

*Primary Examiner*—Edward J. Wise
*Attorney, Agent, or Firm*—Holman & Stern

[57] ABSTRACT

A method and apparatus for classification of supposedly cancerous cytologic preparations with reference to images of cells of these preparations, whereby a preset number n of optical density levels is discriminated in the image of cells of said preparations, the geometrical parameters of cells are measured at each preset level of optical density, and then, on the basis of all the measured geometrical parameters of said cells, the position of each cell is established in the n-dimensional space of these geometrical parameters, each cell being classified as normal or atypical, depending upon its position relative to a hypersurface preset for a given localization.

6 Claims, 8 Drawing Figures

METHOD FOR CLASSIFYING SUPPOSEDLY CANCEROUS CYTOLOGIC PREPARATIONS AND APPARATUS FOR IDENTIFYING SUPPOSEDLY CANCEROUS CYTOLOGIC PREPARATIONS EFFECTING THIS METHOD

The present invention relates to the cybernetic diagnostics of tumors, in particular, cancer, by cytomorphological means, and more particularly, to methods for classifying supposedly cancerous cytologic preparations and an apparatus for identifying supposedly cancerous cytologic preparations effecting these methods.

Known at present are methods for the cytomorphological diagnostics of cancer by analyzing cytological material obtained by means of scraping or washing. These methods are confined to the visual examination of the preparations by looking for accumulations of cells and finding some atypical cells. Attributes in such cases are evaluated only qualitatively and, hence, cannot be used to automate diagnosis.

Also known is a method of selecting atypical cells with reference to the optical density coefficient of the nucleus or the ratio between the diameter of the cell and that of the nucleus, as well as a method for identifying supposedly cancerous cytological preparations, which is based upon a comparison, of the measured values of the maximum distribution of the nucleus-cytoplasm index (the ratio between the area of the nucleus and that of the cell) with constrants being obtained on histological material. These methods, however, do not ensure a sufficiently accurate classification of the supposedly cancerous cytologic preparations.

At the same time, all the above-listed known methods have a common disadvantage which resides in the fact that they all call upon separate measurement of the areas both of the entire cell and its nucleus; it has been experimentally established, however, that the diffuse borderlines of the cell and the nucleus and the presence of additional constituents make it substantially difficult to perfor automatic measurement of the geometrical parameters of the nucleus and the cytoplasm.

In addition, known is a method for the classification of supposedly cancerous cytologic preparations with reference to the areas of the nuclei of cells of these preparations, which is based upon the fact that there is a difference in the distribution of areas of nuclei of cells of normal and cancerous preparations.

We refer now to FIG. 1, where plotted on the abscissa is the area of nuclei $A \times 10\mu^2$, and along the $y$-axis, probability P, shows the distribution of nuclei with reference to the areas for 245 cells of 15 cancerous preparations (the rectangulars are shaded) and 359 cells of 14 normal preparations (the rectangulars are shaded).

As is seen from this figure, the areas of the nuclei of the cells of normal and cancerous preparations are distributed in a peculiar way. These distributions, however, intersect for cells, whose nuclei areas are found within the limits from 2 to $8\mu^2$. As a result, even with a great number of measured cells, the accuracy of identification remains low, because in a cancerous preparation, especially at an early stage of the disease, the number of cancerous cells is but small.

Also known is an apparatus for identifying supposedly cancerous cytologic preparations effecting a method of classification of supposedly cancerous cytologic preparations, wherein signals carrying information about cell image areas of a cytologic preparation at preset levels of optical density of the image of that cell are applied to inputs of a unit for the classification of a cell as normal or atypical, depending upon the cell areas measured at the preset optical density levels, with outputs of said unit being connected to the inputs of a recording unit (cf. T. Ishiyama et al., A Study of the Automation of Cyto Diagnosis, Medical Electronics and Biological Engineering, Vol 7, pp. 297–306, 1969).

The basic disadvantage of the above apparatus resides in its complexity which is determined by the selected method of the classification of preparations on the basis of the distribution of the areas of the nuclei of cells measured at one level of optical density. This device is, in fact, a special-purpose computer which identifies scanned nuclei, measures the areas of the nuclei and then discriminates them with reference to five preset levels. This is followed by calculating the number of nuclei at each level. Classification with the aid of this apparatus makes it necessary to measure more than 10,000 nuclei, which is due to the low information output of the distribution of nuclei areas at five levels in order to classify preparations as normal or pathological. The accuracy of classification in this case remains relatively low, especially in diagnosing early stages of the disease, because in cytologic preparations obtained at an early stage of the disease, most cells do not differ from normal ones with reference to the given attribute (the area of the nucleus). On the other hand, due to the fact that the above known apparatus measures areas only at one optical density level, it may erroneously identify as nuclei such components which, in fact, are not nuclei, such as leucocytes and other blood constituents, as well as places where overlapping of cytoplasms of different cells occurs, etc. In addition, the results of measurements at one optical density level depend upon the color intensity of a preparation.

It is an object of the present invention to provide a method for the classification of supposedly cancerous cytologic preparations, which would make it possible, on the basis of weight division coefficients found in the process of preliminary education and boundary values of a weighed area and the quantity of atypical cells, to diagnose cancer of the given localization, cancer of the cervix uteri both at a late stage and at an early stage of the disease and, carcinoma in situ.

It is also an object of the present invention to provide an apparatus for identifying supposedly cancerous cytologic preparations, which would make it possible to classify cells as normal or atypical depending upon image areas of these cells at preset optical density levels.

Another object of the present invention is to provide an apparatus for identifying supposedly cancerous cytologic preparations, which would also make it possible to classify a cytologic preparation as normal or pathological depending upon the quantity of atypical cells relative to the overall quantity of cells.

In accordance with these and other objects of the present invention, the proposed method for classification of supposedly cancerous cytologic preparations with reference to cell images of these preparations consists, according to the invention, in the discrimination in the cell images of the preparations of a preset number n of optical density levels, measuring the geometrical parameters of cells at each preset optical density level and finding, on the basis of all the measured geometrical parameters of cells, the position of each cell in the n-dimentional space of these geometrical parameters, and then classifying, depending upon the position of each cell in relation to a preset hypersurface for the given localization of cancer, each cell as normal or atypical.

It is expedient that the number of atypical cells relative to those of all the cells measured in the given preparation be compared to a boundary value of the quantity of these cells for the given localization of cancer; the results of this comparison serve to identify said preparation, taken as a whole, as normal or pathological.

The areas of cells may well serve as geometrical parameters thereof.

It has been found that sufficient information can be obtained with six optical density levels of a cell image.

For the cervix uteri localization, a preset hypersurface can best be defined by the following formula:

$$-\frac{S_1}{8}+\frac{5\cdot S_2}{32}-S_3+\frac{9\cdot S_4}{16}-\frac{S_5}{4}+\frac{9\cdot S_6}{32}-52=0,$$

where $S_1$, $S_2$, $S_3$, $S_4$, $S_5$, $S_6$ are the areas measured at the said six optical density levels.

A cytologic preparation may be classified as normal if the number of said atypical cells per 100 measured cells is less that six; it is classified as pathological if the number of atypical cells per 100 measured cells is more than seven.

The above objects of the present invention are also attained due to the fact that in the proposed apparatus for identifying supposedly cancerous cytologic preparations, wherein signals carrying information about areas of the image of a cell of the cytologic preparations at preset optical density levels of the image of that cell are applied to inputs of a unit for classifying cells as normal or atypical, depending upon cell areas measured at preset optical density levels, outputs thereof being connected to a recording unit, the unit for the classification of cells as normal or atypical comprises, in accordance with the invention, a pulse frequency divider which divides a cell image area $S_i$ measured at a preset optical density level $i$ by a weight division coefficient $a_i$ corresponding to that level, and a reversible counter whose counting input is connected to an output of the divider and wherein reversal control inputs are connected to a reversible counter control unit, so that following the application to the input of that unit of a signal carrying information about the serial number of cell image optical density levels, it switches, depending upon the serial number of optical density, the reversible counter into an addition or subtraction position, remaining wherein, after the end of measurements of cell image areas at all the preset optical density levels, is the sum of weighed areas $$\sum_{i=1}^{n}\frac{S_i}{a_i},$$

and which also comprises a decoding circuit whose code inputs are connected to digit outputs of the reversible counter and taking place wherein, following the application to an interrogation bus of a signal as to the end of the measurements of the cell image areas at all the preset optical density levels, is a comparison of said sum of the weighed areas with a limiting value A of that sum for an atypical cell, with the outputs of the decoding circuit being connected to the recording unit so that, depending upon the sign of the difference $$\sum_{i=1}^{n}\frac{S_i}{a_i}-A,$$

a cell is classified as normal or atypical, and a signal corresponding to the type of the cell is applied to a respective channel of the recording unit.

It is expedient that the apparatus be provided with a unit for classifying a cytologic preparation as normal or pathological, whose inputs would be connected to the outputs of the recording unit, so that taking place therein would be a comparison of the number of atypical cells of a cytologic preparation with a boundary value of atypical cells preset for the given localization, which serves to identify the preparation as a whole.

The above design of the proposed apparatus for effecting the proposed method, in accordance with the invention, makes it possible to carry out an automatic identification of supposedly cancerous cytologic preparations and to discriminate pathological preparations, the probability of identifying preparations obtained both at the late stage of cancer of the given localization and at the stage at which carcinoma in situ is close to 100 percent. It should be noted that following a detection of the stage of carcinoma in situ of the given localization, the cure practically results in 100 percent recovery.

The invention will hereinafter be explained in greater detail with reference to a preferred embodiment thereof, taken in conjunction with the accompanying drawings, wherein.

Figure 1:
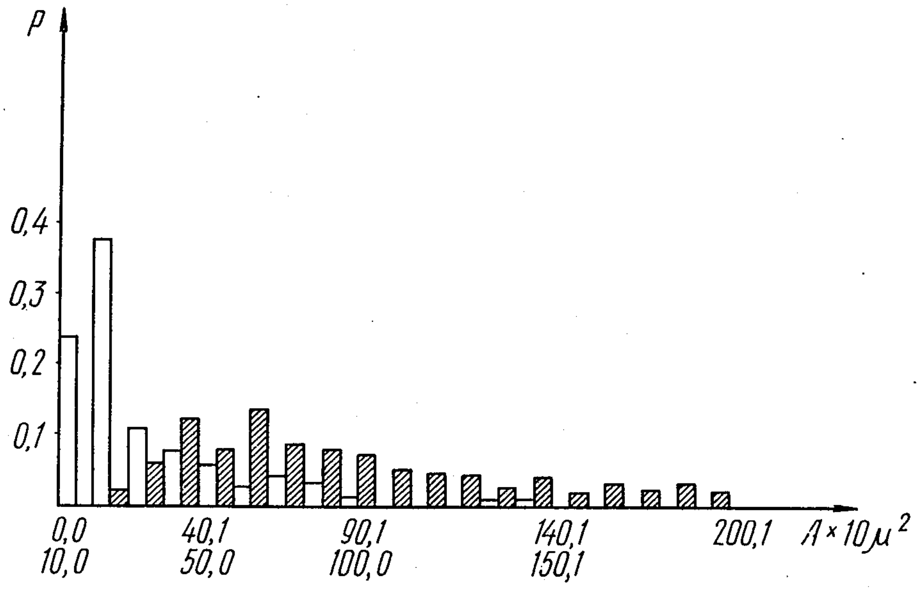

The proposed method for classification of supposedly cancerous cytologic preparations is as follows.

In images of tested cells, n optical density levels are discriminated. A required number n of optical density levels of the image was found in the process of preliminary education. Measured at each optical density level $i(i = 1, 2, \ldots, n)$ of the image are geometrical parameters of cells. Then, on the basis of all the geometrical parameters measured, position of each cell is established in the $n$-dimensional space of the geometrical attributes, and, depending upon the position of the cell in relation to the hypersurface found in the course of preliminary education for the given cancer localization, the cell is classified as normal or atypical.

In the proposed method, areas serve as geometrical parameters of the cell image. This role, however, may also be performed by perimeters or a combination of perimeters and an area.

It was found in the course of preliminary education that it is sufficiently informative to measure cell image areas of a preparation being tested at six levels of optical density of the cell image. In this case, for the given localization, cervix uteri, the hypersurface is defined by the following formula:

$$-\frac{S_1}{8}+\frac{5\cdot S_2}{32}-S_3+\frac{9\cdot S_4}{16}-\frac{S_5}{4}+\frac{9\cdot S_6}{32}-52=0,$$

where $S_1, S_2, S_3, S_4, S_5, S_6$ are cell image areas measured at six optical density levels.

In the process of consecutive classification of cells as normal or atypical, the registration of the number of atypical cells and the total number of measured cells takes place. Then, the number of said atypical cells in relation to that of all cells measured in a given preparation is compared to a boundary value of the number of those cells for the given localization, the results of this comparison serving to identify the preparation as normal or pathological (suspected to be malignant). The preparation is classified as normal if the number of atypical cells is less than six, and as pathological, if the number of atypical cells is more than seven.

The proposed apparatus for identifying supposedly cancerous cytological preparations, effecting, in accordance with the present invention, the proposed method of classification of these supposedly cancerous cytologic preparations, comprises a unit 1 (FIG. 2) for classifying cells as normal or atypical, applied to inputs thereof are signals carrying information about areas $S_i$ of the cell image of the cytologic preparation at the preset levels $i = 0, 1, ..., n$ of optical density of the image of that cell, n in the present embodiment being equal to 6, and about a serial number of the levels, in the present embodiment, $i = 1, 2, 3, 4, 5$ and 6, and $S_i = S_1, S_2, S_3, S_4, S_5, S_6$. Accordingly, the classification of the cell as normal or atypical is effected depending upon the cell areas measured at the preset six levels of optical density. Outputs of the unit 1 for classifying cells as normal or atypical are connected to inputs of a recording unit 2, whose outputs are connected to inputs of a unit 3 for classifying a cytologic preparation as normal or pathological (suspected to be malignant).

In the present embodiment of the proposed apparatus, signals carrying information about the cell image areas of a cytologic preparation at preset optical density levels of the cell image and the serial number of the levels are applied to the unit 1 for classifying cells as normal or atypical from the source of these signals, which is an information parameter transducer 4, the information parameter in the present embodiment being cell image areas at the preset six optical density levels, and from a unit 5 controlling the operation of the entire apparatus, the latter's outputs being connected to an input of the transducer 4, whereas its input is connected to an output of the cytologic preparation classification unit 3.

In the present embodiment, the information parameter transducer 4 includes a widely known television camera, applied to which is an image of a portion of cytologic preparation magnified under a microscope. Connected to an output of the television camera is a video signal shaper amplifier, applied to which is also a signal containing information about the optical density level whereat measurement is being carried out. An output of the video signal shaper amplifier is connected to an input of an AND circuit, applied to another input thereof are pulses from a timing pulse generator, so that the number of pulses at the output of that circuit is proportional to the cell image area at the given level of optical density. The design principles for such transducers, which include means for scanning an image, a video shaper amplifier, an AND circuit, and a timing pulse generator are well known and are described, for example, in the paper "A Study of the Automation of Cytodiagnosis," by T. Ishiyama et al, Medical and Biological Engineering, 1969, volume 7, page 301.

The unit 5 controlling the operation of the entire apparatus employs semiconductor components, transistors and integrated circuits, and makes it possible to discriminate the optical density levels preset for the given measurement and give signals as to the start of measurement, a transfer from one optical density level to another and to the end of measurement. In addition, the unit 5 for controlling the operation of the entire apparatus effects the initial setting of the entire apparatus before the start of cell measurements and, by a signal from the cytologic preparation classification unit 3, ends the measurement of cells of the given preparation.

The unit 1 for classifying cells as normal or atypical comprises a pulse frequency divider 6, whose inputs are connected directly to the transducer 4 and the control unit 5; taking place therein is the division of the area $S_i$ of a cell image, i.e. $S_1, S_2, S_3, S_4, S_5, S_6$ measured at a preset level i of optical density, i.e. $i = 1, 2, 3, 4, 5, 6$ by a weight division coefficient $a_i$, i.e. $a_1, a_2, a_3, a_4, a_5, a_6$, corresponding to that level, or, to express it mathematically, $$\frac{S_i}{a_i},$$

i.e. for the present embodiment, $$\frac{S_1}{a_1}, \frac{S_2}{a_2}, \frac{S_3}{a_3}, \frac{S_4}{a_4}, \frac{S_5}{a_5}, \frac{S_6}{a_6}.$$

The cell classification unit 1 also comprises a reversible counter 7, whose counting input is connected to the outputs of the divider 6, whereas reversal control inputs are connected to a unit 8 for control of the reversible counter 7 whose input is connected to the control unit 5. Control inputs of the reversible counter 7 are connected to the control unit 8 so that following the application to an input of the unit 8 of a signal carrying information about a serial number of the cell image optical density levels, the control unit 8 switches, depending upon the serial number of optical density, the reversible counter 7 to the addition or substraction position, remaining wherein, after the end of the measurement of the cell image areas at all the preset levels of optical density, which are six in number, is the sum of weighed areas $$\sum_{i=1}^{n} \frac{S_i}{a_i},$$

for the present embodiment, $$\frac{S_1}{a_1}+\frac{S_2}{a_2}+\frac{S_3}{a_3}+\frac{S_4}{a_4}+\frac{S_5}{a_5}+\frac{S_6}{a_6}, \text{ or } \sum_{i=1}^{6}\frac{S_i}{a_i}.$$

Since the control unit 8 switches the reversible counter 7 to the addition or subtraction position depending upon the number of the cell image optical density level, $$\sum_{i=1}^{6}\frac{S_i}{a_i}$$

is an algebraic sum which may be greater or smaller than 0.

In addition, the cell classification unit 1 comprises a decoding circuit 9, whose interrogation bus is connected to the output of the divider 6, and its code inputs, to digit outputs of the reversible counter 7; taking place therein upon the application of a signal to the interrogation bus of as to the end of measurement of cell image areas at all the preset levels i of optical density, is a comparison of the said sum of the weighed areas with a limiting value A of that sum for an atypical cell. Outputs of the decoding circuit 9 are connected to the recording unit 2 so that depending upon the sign of the difference $$\sum_{i=1}^{n}\frac{S_i}{a_i} - A,$$

the cell is classified as normal or atypical and a signal corresponding to the type of the cell is applied to a respective channel of the recording unit 2.

The divider 6 (FIG. 3) comprises series-connected in the counting conditions (binary counter) flip-flops 10, 11, 12, 13, 14, OR circuits 15, 16, 17, 18, AND circuits 19, 20, 21, 22, 23, 24 and binary decade counter 25.

The output of the transducer 4 is connected to a counting input of the flip-flop 10 and to an input of the AND circuit 19, whose second input is connected to an output three of the counter 25. A direct dynamic output of the flip-flop 10 is connected to an input of the OR circuit 15, whose second input is connected to a direct dynamic output of the flip-flop 13. An inverse dynamic output of the flip-flop 10 is connected to an input of the flip-flop 11. A direct dynamic output of the flip-flop 11 is connected to an input of the AND circuit 20, connected to the second input thereof is an output five of the counter 25, and to an input of the OR circuit 17, whose second input is connected to an output of the flip-flop 14. The inverse dynamic output of the flip-flop 11 is connected to an input of the flip-flop 12, whose direct dynamic output is connected to the AND circuit 21, whose second input is connected to the first output of the counter 25 and to the OR circuit 16, whose second input is connected to the direct dynamic output of the flip-flop 14. The inverse dynamic output of the flip-flop 12 is connected to the input of the flip-flop 13, whose inverse dynamic output is connected to the input of the flip-flop 14. The output of the OR circuit 15 is connected to the input of the AND circuit 22, whose second input is connected to the fourth output of the counter 25. The output of the OR circuit 16 is connected to the input of the AND circuit 23, whose second input is connected to the second output of the counter 25. The output of the OR circuit 17 is connected to the input of the AND circuit 24, whose second input is connected to the sixth output of the counter 25. The outputs of the AND circuits 19, 20; 21, 23, 24 are connected to the inputs of the OR circuit 18, whose output is connected to the input of the reversible counter 7. The input of the counter 25 is connected to the output of the unit 5 controlling the operation of the entire apparatus, with the seventh output of the counter 25 being connected to the decoding circuit 9.

The reversible counter 7(FIG. 2) is designed according to the well-know circuitry of a binary decade reversible counter with a sign flip-flop employing integrated circuits. If desired, the sum $$\sum_{i=1}^{6}\frac{S_i}{a_i}$$

may be passed to a printing calculator (not shown).

The reversible counter 7, and the control unit 8 with the given weight division coefficients presents an integrated counter trigger.

Figures 2, 4:
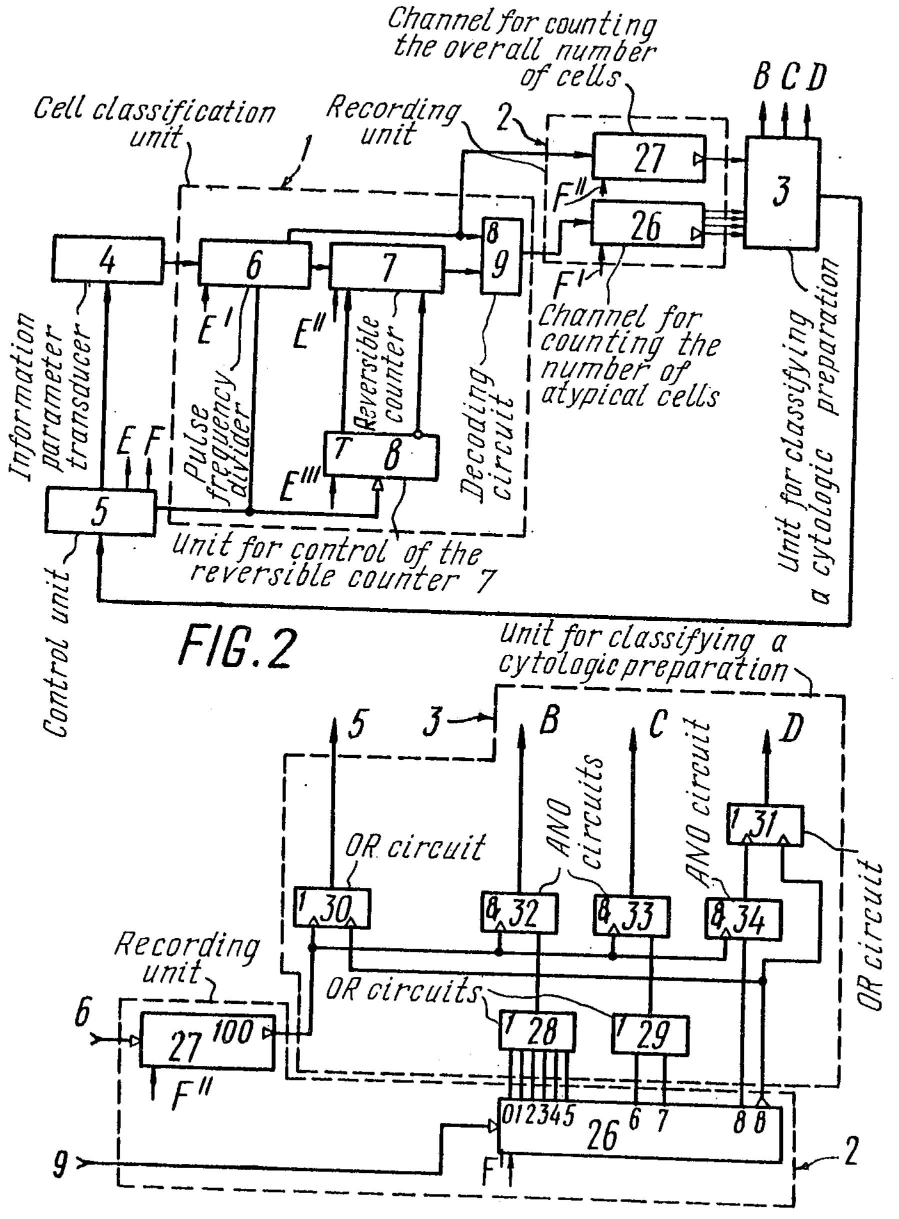
FIG. 2 is a block diagram of an apparatus for identifying supposedly cancerous cytologic preparations, in accordance with the invention, effecting the proposed method.
FIG. 4 is a functional diagram of a unit classifying a preparation as normal or pathological of the proposed apparatus, in accordance with the invention.

The decoding circuit 9 has two channels, whose outputs are connected to the input of the recording unit 2. One of the channels is an integrated AND circuit, whose code input is connected to the output of the sign flip-flop of the reversible counter, whereas the interrogation bus is connected to the seventh output of the counter 25 (FIG. 3) of the divider 6. The second channel sends an interrogation pulse directly to the input of the recording unit 2 (FIG. 2).

In the present embodiment, the recording unit 2 has two channels, 26 and 27, the channel 26 being designed to count the number of atypical cells, whereas the channel 27 is meant to count the overall number of cells. Each channel is designed as a well-known binary decade counter analogous to the counter 25 (FIG. 3) and employs integrated circuits.

The cytologic preparation classification unit 3 (FIG. 4) comprises OR circuits 28, 29, 30, 31 and integrated AND circuits 32, 33, 34. Inputs of the OR circuit 28 are connected to the zero, first, second, third, fourth and fifth outputs of the channel 26. Inputs of the OR circuit 29 are connected to the sixth and seventh outputs of the channel 26. Inputs of the AND circuit 34 are connected to the static output of the channel 26 and the 100th dynamic output of the channel 27. The output of the AND circuit 34 is connected to the input of the OR circuit 31, whose second input is connected to the eighth dynamic output of the channel 26. The output of the OR circuit 29 is connected to the input of the AND circuit 33, whose second input is connected to the 100th dynamic output of the channel 27. The output of the AND circuit 28 is connected to the input of the AND circuit 32, whose second input is connected to the 100th dynamic output of the channel 27. Inputs of the OR circuit 30 are connected to the 100th dynamic output of the channel 27 and the eight dynamic output of the channel 26. The output of the OR circuit 30 is connected to the input of the control unit 5. After measuring a required number of cells by way of comparison of the number of atypical cells of a cytologic preparation with the boundary quantity of atypical cells preset for the given localization of cancer, the cervix uteri, a signal appears at one of the outputs B (the AND 32 output), C (the AND 33 output) or D (the AND 31 output). If the signal appears at the output B, the preparation is classified as normal; if it appears at the output C, the preparation is classified as unidentified, after which the preparation is subjected to another measurement; if the signal appears at the output D, the preparation is classified as pathological. The output E (FIG. 2) of the control unit 5 is connected to inputs E', E'', E''' for the initial setting of the divider 6, the reversible counter 7 and the reversible counter 7 control unit 8, whereas an output F of the control unit 5 is connected to inputs F', F'' for the initial setting of the channels 26 and 27.

Figure 5:
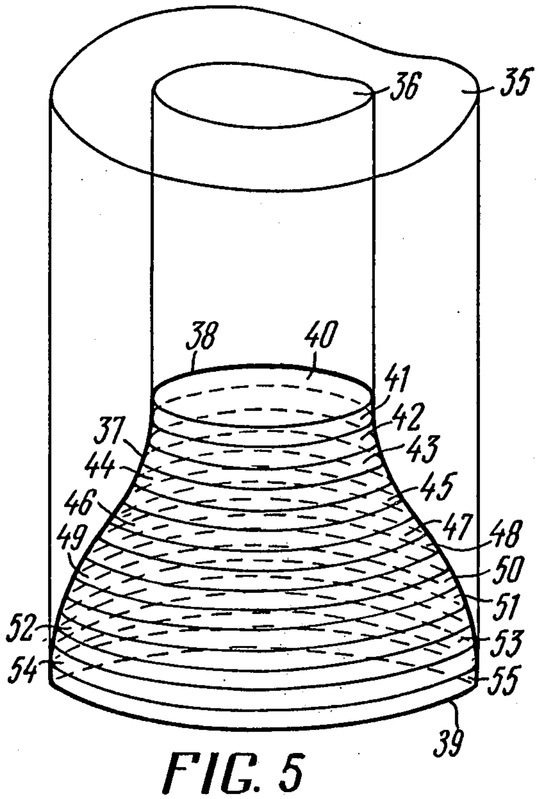
FIG. 5 shows a three-dimensional view of the optical density levels of a cell image of a cytologic preparation, in accordance with the invention.

In the present embodiment, six optical density levels of the image of the cell having cytoplasm 35 (FIG. 5) and a nucleus 36 are selected, according to the proposed method, for the classification of cells.

The image of a discriminated cell is scanned, and a video signal 37 obtained is truncated, as it were, from the black level 38 to the white level 39 by 16 planes at different levels of optical density, each plane having the same level of optical density.

The selection of the number of levels is determined by the possibility of measuring them and their sufficient information output. It is generally known that an increase in the number of attributes leads to an increase in the accuracy of identification, although the increase becomes negligible after a certain value; at the same time, with a great number of optical density levels, the results of the measurements are increasingly affected by the non-uniformity of the image background, which makes the calculations more complicated. In the process of preliminary education, it has been found for the given localization, cancer of the cervix uteri, that with the division of the video signal 37 into 16 levels 40, 41, 42, 43, 44, 45, 46, 47, 48, 49, 50, 51, 52, 53, 54, 55 of optical density, the levels 41, 43, 45, 47, 49, 51 of optical density are sufficiently informative.

At each of the above six optical density levels, the areas of cell images are measured, which determine in the six-dimensional space of the attributes the position of a point corresponding to a given cell. Calculated in advance in the same six-dimensional space of attributes is a hypersurface which divides in an optimum manner the multitudes of normal and atypical cells by way of preliminary education on cytologic material obtained by an experienced cytologist for preselected ones in the preparations of the class of cancerous cells and several classes of normal cells (for different layers of flat epithelium). In dividing the multitudes of cells in the six-dimentional space of attributes according to cell areas at different levels of optical density, the equation of the linear dividing surface (the hyperplane) will be as follows:

$$\sum_{i=1}^{6} \frac{S_i}{a_i} - A = 0.$$

For the given cancer localization, the cervix uteri, the following expression is obtained;

$$31\tfrac{1}{8} S_1 + 5/32\, S_2 - S_3 + 9/16\, S_4 - \tfrac{1}{4} S_5 + 9/32\, S_6 - 52 = 0,$$

where $S_1 - S_6$ in $\mu^2$.

Cells are classified as normal or atypical depending upon the position thereof in relation to the dividing hyperplane. Thus, if the value of the coordinates of a cell, calculated with reference to the dividing hyperplane equation, is more than zero, the cell is classified as normal. In case it is less than zero, the cell is classified as atypical.

Figure 6:
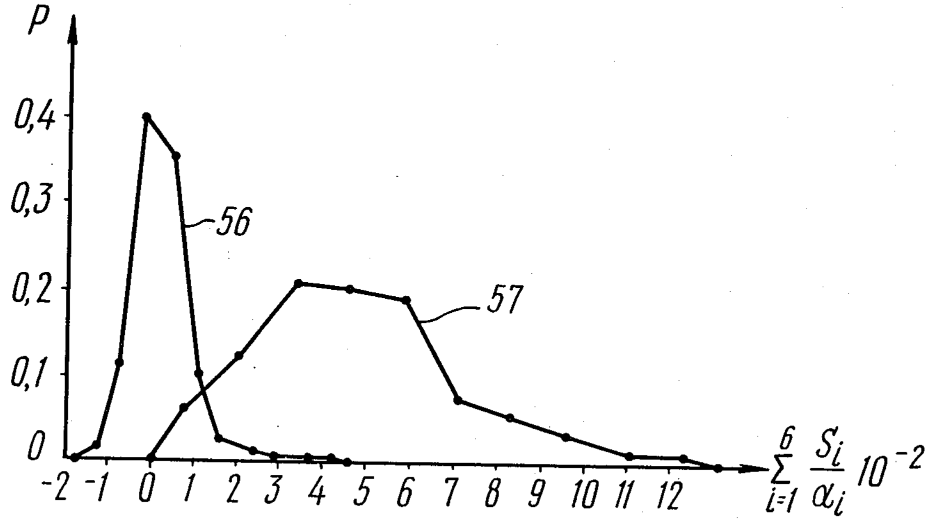
FIG. 6 is a graph of the distribution of the weighed areas explaining the operation of the cell classification unit of the proposed apparatus.

As is seen from FIG. 6, where plotted on the abscissa is $$\sum_{i=1}^{6} \frac{S}{a_i} 10^{-2} \text{ in } \mu^2,$$

and plotted along the y-axis is probability P, graphs 56 and 57 of the distribution for cancerous cells and cells of the deep surface layer obtained with regard to the statistical education material with measurements of areas at the six levels of optical density (in the six-dimensional space) by projecting a multitude of points on a perpendicular to the optimum dividing hyperplane show little crossing, i.e. ensure sufficient identification accuracy. Similar results are obtained for the distribution of cancerous cells and cells of other layers of flat epithelium.

Figure 7:
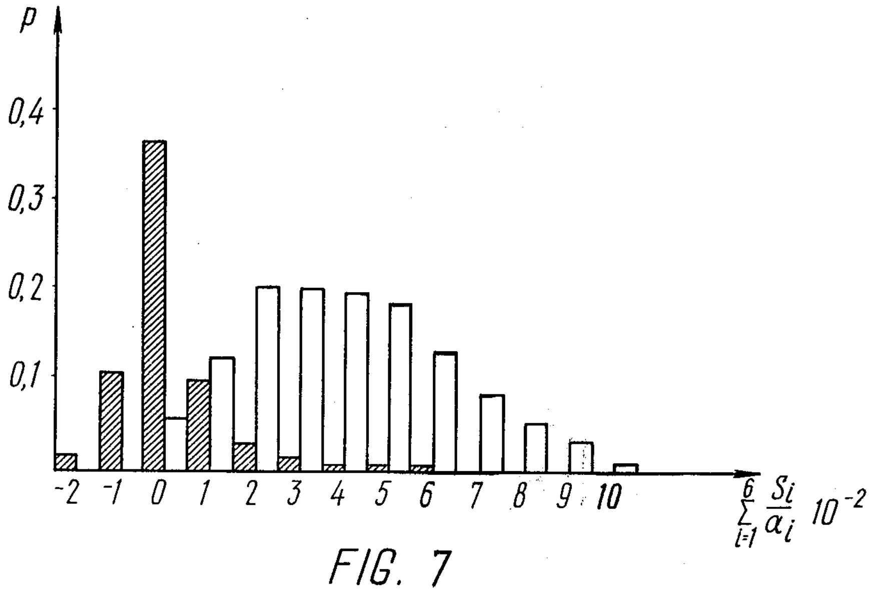
FIG. 7 is a graph of the summary distribution of atypical cells explaining the classification, in accordance with the invention.

A comparison of the distribution of normal and cancerous cells with reference to the parameters employed in the known method (FIG. 1) and the proposed method (FIG. 7), which is identical to FIG. 6 but is made, for reasons of comparison, in the form analogous to FIG. 1, where plotted along the abscissa is the weighed area $$\sum_{i=1}^{6} \frac{S_i}{a_i} \text{ in } \mu^2,$$

and plotted along the y-axis is probability P, shows that the parameter $$\sum_{i=1}^{6} \frac{S_i}{a_i}$$

is more effective in discriminating normal and cancerous cells than areas of nuclei per se.

Three-group classification of a preparation is effected according to the results of the classification of individual cells. For this purpose, the number of atypical cells (with reference to all the cells measured in the preparation) is compared to preset boundary values; in case the number of atypical cells exceeds the upper boundary value $Z_1$ (FIG. 8), the preparation is classified as pathological; if the number of atypical cells is less than the lower boundary value, $Z_2$, the preparation is classified as normal; with the number of atypical cells being found between the boundary values, the preparation is unidentified, which means that no classification has been achieved and another analysis is required of the same or other preparation from the same patient.

Figure 8:
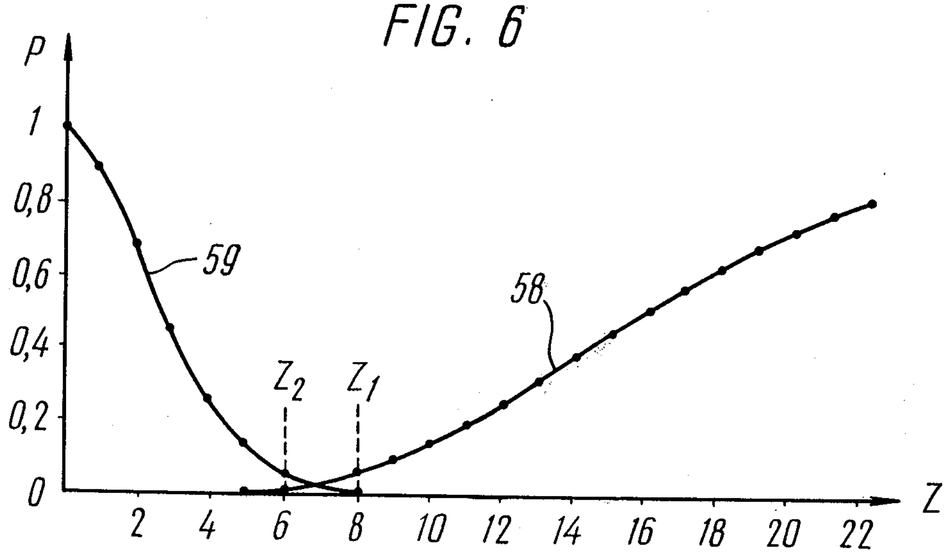
FIG. 8 is a graph of summary distribution of atypical cells, explaining the operation of the preparation classification unit of the proposed appartus, in accordance with the invention.

FIG. 8, where plotted on the abscissa is the number of atypical cells and on the ordinates, probability P, shows curves 58 and 59 of the probability of errors of the first kind (false-positive) and errors of the second kind (false-negative), respectively, for the classification of preparation with reference to areas measured at the six optical density levels. It is clear that a selection of different boundaries is possible for the classification of preparations. If one boundary is selected (the number of atypical cells Z = 7 of 100 cells measured), there will be no unidentified preparations, but errors of the first kind (3.7 percent) and of the second kind (2.7 percent will be too great. It is expedient therefore that two boundary values be selected, $Z_1$ = 8 (the upper one) and $Z_2$ = 6 (the lower one). In this case, errors of the first kind (the classification of a normal preparation as pathological (will constitute 1.9 percent, and errors of the second kind (the classification of a pathological preparation as normal) will amount to 1.1 percent. Some 5 percent of the preparation will remain unidentified.

Classification does not always make it necessary to measure up to 100 cells. This number of cells is required only for the cases when the number of atypical cells is below the upper boundary value. If the quantity of atypical cells is above that limit with a total quantity of measured cells less than 100, no further measurements are required.

The operating principle of the proposed apparatus for identifying supposedly cancerous cytologic preparations, which effects the proposed method for identifying supposedly cancerous cytologic preparations, is as follows.

Information is applied from the control unit 5 (FIG. 2) to the input of the information parameter transducer 4 as to which optical density level measurement of the cell image area is to be carrier out. The measured area is applied, in the form of a number of pulses proportional to the measured area, to the input of the divider 6, and information is applied to the second input thereof from the control unit 5 about the optical density level at which the measurement is being carried out, in order to select a weight division coefficient $a_i$.

The divider 6 (FIG. 3) operates as follows.

From the output of the information parameter transducer 4, pulses are applied to the counting input of the flip-flop 10. The flip-flops 10, 11, 12, 13 and 14 operate as a binary counter, which means that the number of pulses at the output of the flip-flop 10 is equal to that of the output of the transducer 4 (i.e. the area measured) divided by two; the output of the flip-flop 11 is equal to the number of pulses at the output of the transducer 4 divided by four; the outputs of the flip-flops 12, 13 and 14 are equal to the number of pulses at the output of the transducer 4 divided by eight, sixteen and thirty-two, respectively. By using the output of the transducer 4, the flip-flops 11 and 12 and combined with the OR circuits 15, 16 and 17 the outputs of the flip-flops 10 and 13, 12 and 14, 11 and 14, respectively, applied to the dynamic inputs of the AND circuits 19, 20, 21, 22, 23, 24 is the measured area divided by 1, 4, 8, 16/9, 32/5, 32/9, respectively. To initiate each next flip-flop, the inverse dynamic outputs of the flip-flops 10, 11, 12, 13 are used; applied to the inputs of the AND circuits 20, 21 and OR circuits 15, 16, 17 are pulses from the direct dynamic outputs of the flip-flops 10, 11, 12, 13, 14 in order to prevent overlapping of pulses from different flip-flops. Applied to the second inputs of the AND circuits 19, 20, 21, 22, 23, 24 is the enabling signal from the third, fifth, first, fourth, second and sixth outputs of the counter 25, respectively. Applied to the input of the counter 25 are signals of a transfer from one optical density level of a cell image to another; in the course of measurement at the level 41 (FIG. 5), the signal is present at the first output; in the course of measurement at the level 43 of optical density, it is present at the second output, and the sequence continues up to the sixth output. Before the start of measurements, the counter 25 (FIG. 3) is unset, and following the end of measurements, i.e. after measurements at the six required levels have been completed, the pulse from the seventh dynamic output of the counter 25 is applied to the interrogation bus of the AND circuit of the decoding circuit 9 (FIG. 2) and to the input of the channel 27. It should be noted that the selection of the required six levels, 41, (FIG. 5), 43, 45, 47, 49, 51 from the sixteen levels and a consecutive transfer from one to another are effected in the control unit 5 (FIG. 2).

Thus, when measured at each level of optical density, the area, divided by the respective weight division coefficient, passes through the only one of the AND circuits 19 (FIG. 3), 20, 21, 22, 23, 24 and is applied from the output of the AND circuit 18 to the counting input of the reversible counter 7, the area measured at the level 41 (FIG. 5) being divided by the weight division coefficient 8; the area measured at the level 43 being divided by 32/5; the area measured at the level 45 being divided by 1; the area measured at the level 47 being divided by 16/9; the area measured at the level 49 being divided by 4; the area measured at the level 51 being divided by 32/9.

The reversible counter 7 (FIG. 2) is designed according to the well-known circuitry of a binary decade reversible counter. The switching of the reversible counter 7 to the addition or subtraction position is effected by applying signals from the unit 8 of control of the reversible counter 7. The switching of the reversible counter 7 to the subtraction position is necessary because it has been found in the course of education that weight division coefficients $a_i$ in the sum $$\sum_{i=1}^{6} \frac{S_i}{a_i}$$

may be greater and smaller than zero. The divider 6 divides the measured area by $a_i>0$, the switching of the counter to the subtraction position being equivalent to $a_i<0$. In addition, in determining weight division coefficients $a_i$ in the course of education, it has been found that the sign of $a_i$ changes with a transfer from one optical density level of the image to another, i.e. that $a_1$, $a_3$ and $a_5$ corresponding to the levels 41 (FIG. 5), 45, 49 are less than zero, whereas $a_2$, $a_4$ and $a_6$ corresponding to the levels 43, 47, 51 are greater than zero. For that reason, the control unit 8 (FIG. 2) is designed as a flip-flop in the counting conditions, which is switched with a transfer from one level to another. Before the start of measurements, the flip-flop 8 is set so that the reversible counter 7 is set in the addition position. With the transfer to the level 41 (FIG. 5), the flip-flop switches the reversible counter 7 (FIG. 2) to the subtraction position; with the transfer to the level 43 (FIG. 5), it switches the counter to the addition position, and so on, up to the level 51. As a result, following the end of measurements of cell image areas at all the levels, remaining in the reversible counter 7 (FIG. 2) is the weighed area which is expressed by the following algebraic sum:

$$\sum_{i=1}^{6} \frac{S_i}{a_i} = \frac{S_1}{8} + \frac{5 \cdot S_2}{32} - S_3 + \frac{9 \cdot S_4}{16} - \frac{S_5}{4} + \frac{9 \cdot S_6}{32},$$

which may be both greater and smaller than zero. It was further found in the process of education that if the weighed area is greater than the boundary value equal to 52, the cell is classified as normal; if it is smaller than that value, the cell is classified as a typical. For greater convenience of comparing a weighed area with the boundary value of the weighed area, recorded in the reversible counter 7 before the start of the measurements is not zero, but minus fifty two. This is effected by applying a pulse from the control unit 5. Thus, if after the end of measurement the sum $$\sum_{i=1}^{6} \frac{S_i}{a_i} - 52$$

is greater than zero, the cell is to be classified as normal; if it is less than zero, the cell is to be classified as a typical. In addition it is possible to connect the outputs of the reversible counter 7 to the inputs of a printing calculator in order to record $$\sum_{i=1}^{6} \frac{S_i}{a_i} - 52.$$

Figure 3:
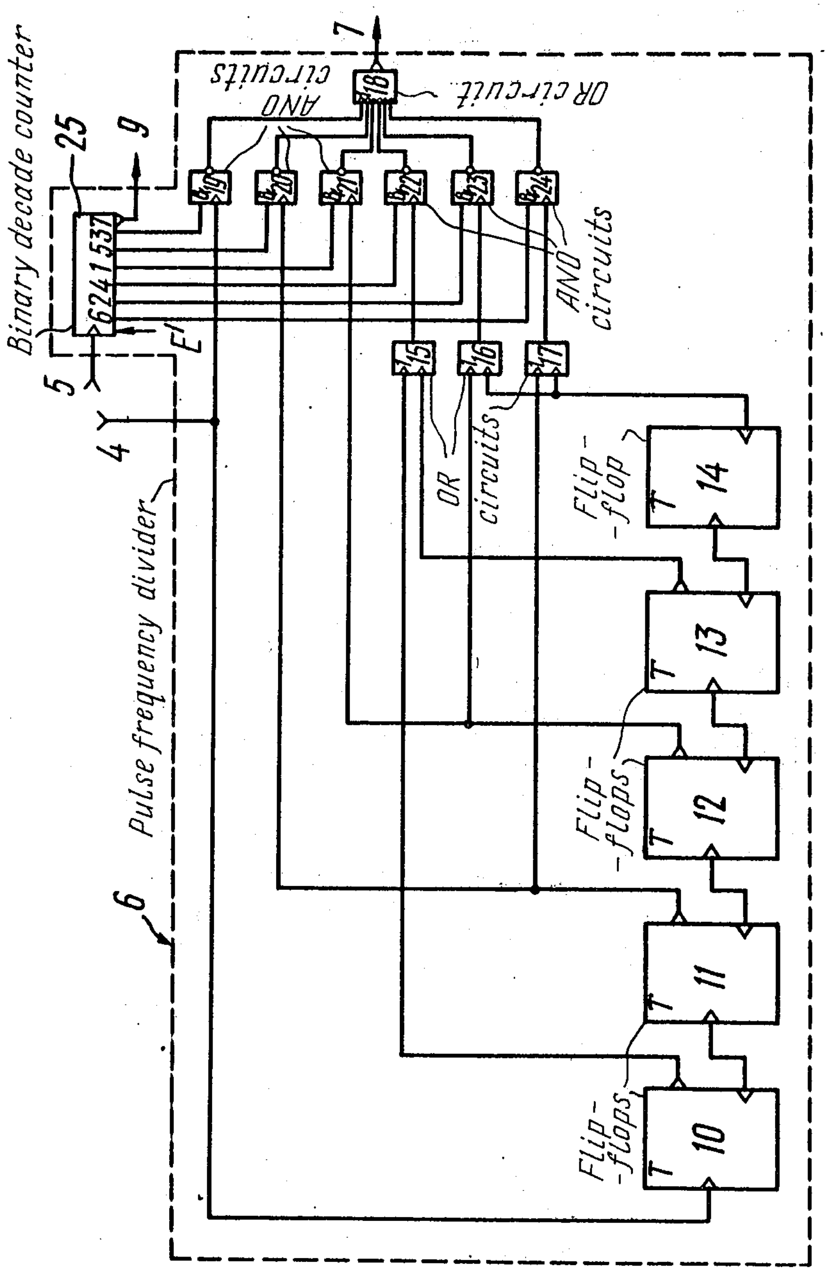
FIG. 3 is a functional diagram of the pulse frequency divider of the proposed apparatus.

The output of the sign flip-flop of the reversible counter 7 is connected to the input of the AND circuit of the decoding circuit 9, applied to the second input thereof is an interrogation pulse from the seventh dynamic output of the counter 25 (FIG. 3). This pulse is applied following the end of the measurements at the six levels 41 (FIG. 5), 43, 45, 47, 49, 51. If $$\sum_{i=1}^{6} \frac{S_i}{a_i} - 52 > 0,$$

no interrogation pulse passes through the AND circuit of the decoding circuit 9 (FIG. 2), which means that the cell is classified as normal; if $$\sum_{i=1}^{6} \frac{S_i}{a_i} - 52 < 0,$$

the interrogation pulse is applied via the AND circuit to the input of the channel 26, wherein the counting of the number of a typical cells takes place. Besides, the interrogation pulse is applied from the seventh output of the counter 25 (FIG. 3) to the input of the channel 27 (FIG. 2), wherein the counting of the total number of measured cells takes place. It should be noted that before the start of measurements of cells of a given preparation, the channels 26 and 27 are set to zero by a signal from the control unit 5.

Thus, recorded in the channels 27 and 26, respectively, is the total number of measured cells of a given preparation and the number of a typical cells out of the total number of cells.

As it has been stated above, the selection of the lower boundary value of the quantity of a typical cells $Z_2$ = 6 and the upper boundary value of a typical cells $Z_1$ = 7 out of the total number of cells reduces errors of the first and second kinds to a minimum. A preparation in which the number of a typical cells is equal to 6 or 7 is classified as unidentified, so a repeated measurement of cells of that preparation is necessary.

Classification of preparations with regard to the boundary values $Z_1$ and $Z_2$ is effected by the preparation classification unit 3 (FIG. 4).

It operates as follows. The zero, first, second, third, fourth and fifth outputs of the channel 26 are connected to the inputs of the OR circuit 28. If the number of a typical cells is equal to zero, an enabling signal appears only at the zero output of the channel 26; if it is equal to unity, an enabling signal appears at the first output, etc. Thus, if the number of a typical cells is between zero and five, there is an enabling signal at the output of the OR circuit 28. Similarly, if the number of a typical cells is equal to six or seven, there is an enabling signal at the output of the OR circuit 29; if it is equal to eight, there is an enabling signal at the eighth output of the channel 26. When the number of measured cells reaches 100, a pulse appears at the 100 th dynamic output of the channel 27, which is applied to the inputs of the OR circuit 30 and the AND circuits 32, 33, 34. Through the OR system 30, this pulse is applied to the control unit 5 to stop measuring cells of the given preparation. Then, depending upon the number of a typical cells, this pulse is applied through one of the AND circuits 32, 33 or 34 (via the AND circuit 34 and OR circuit 31) to one of the outputs B, C or D, respectively, and serves as a signal for the classification of the preparation. If the pulse is applied to the output B, the preparation is classified as normal; if it is applied to the output C, the preparation is regarded as unidentified (a repeated measurement is then required); if the pulse is applied to the output D, the preparation is classified as pathological. In addition, if there are eight a typical cells out of a total number of measured cells of less than 100, the pulse from the eight dynamic output of the channel 26 passes through the OR circuit 31 to the output D (thus indicating that the preparation is pathological) and via the OR circuit 30, to the input of the control unit 5 to end the measurement of cells of the given preparation.

The results of clinical tests of the proposed apparatus for identifying supposedly cancerous cytologic preparations, effecting the proposed method, in accordance with the invention, are listed in Tables 1 and 2.

A total of 389 preparations have been tested, which were obtained in the course of preventive examinations.

Table 1 lists the results of the first identification of preparations. As may be seen from the Table, out of the total of 317 preparations diagnosed as "normal" with the aid of conventional methods, the proposed method revealed 273, or 86 percent, to be normal; 31 preparations (10 percent) were identified as pathological; 13 preparations (4 percent) remained unidentified and, hence, required another measurement. Out of the 31 preparations with the diagnosis "Ca" (for the most part, at early stages), not a single preparation was identified as normal, 27 preparations (87 percent) being identified as pathological, and 4 preparations (13 percent) found wanting another measurement.

A special point should be made with regard to the medical diagnosis worded as "doubtful." This group includes preparations which cannot be diagnosed as "Ca," but which cases have to be registered at cancer detection centers for a repeated examination after a period of time. Of this group of preparations, 7 (17 percent) were subsequently identified as normal; 30 preparations (73 percent) were found pathological; and 4 preparations (10 percent) called for a repeated measurement.

Table 2 lists the results of a repeated testing of the preparations. Of the 13 preparations diagnosed as "normal" with the aid of conventional methods and unidentified by the proposed method during the first test, 9 preparations were selected for testing, all being found normal. Of the 4 preparations having the medical diagnosis "Ca," all four were found pathological during the repeated test; of the 4 doubtful preparations, all four were identified as pathological.

Table 1

| Medical diagnosis / Machine diagnosis | Normal | Pathological | Unidentified | Total |
|---|---|---|---|---|
| Norma | 273<br>86% | 31<br>10% | 13<br>4% | 317 |
| Ca | 0<br>0% | 27<br>87% | 4<br>13% | 31 |
| Doubtful | 7<br>17% | 30<br>73% | 4<br>10% | 41 |

Table 2

| Medical diagnosis / Machine diagnosis | Normal | Pathological |
|---|---|---|
| Norma | 9 | 0 |
| Ca | 0 | 4 |
| Doubtful | 0 | 4 |

Thus, taking into consideration the results of the first and second tests, it may be stated that of the 317 normal preparations, 282 (89 percent) were identified correctly; 31 (10 percent) were erroneously identified as pathological; and 4 preparations were not tested for the second time.

Of the 30 preparations diagnosed as "Ca," all (100 percent) were identified as pathological; of the 41 doubtful preparations, 7 (17 percent) were identified as normal and 34 (83 percent) were identified as pathological.

The proposed apparatus may find application on both in research and preventive examination. In the latter case, it is advisable that the diagnosis be carried out in two stages. During the first stage, the apparatus for identifying supposedly cancerous cytologic preparations discriminates preparations as normal and pathological; in the second stage, all the preparations found to be pathological are re-examined by an experienced cytologist. Thus, the task facing the inventors was to provide as reliable a detection for cancer as possible, especially at early stages of the disease. That was accompanied by a great percentage of false-positive errors. Therefore, the lower and upper boundary values of the number of atypical cells $Z_2$ and $Z_1$, were shifted from the values 6 and 7, at which errors of the first and second kinds were reduced to a minimum, to the values of 4 and 5, at which false-negative errors are less than with $Z_1 = 7$ and $Z_2 = 6$; this however, raises the number of false-positive diagnoses.

The latter is due to the fact that preparations identified as pathological are then tested by an experienced cytologist who can select the normal preparations erroneously identified as pathological. Preparations identified as normal are not subjected to further investigation.

It should be noted that although no preliminary education was carried out with regard to doubtful preparations, the apparatus, designed in accordance with the present invention, identifies most of these preparations as pathological, which is absolutely justifiable from the viewpoint of preventive examination.

The proposed apparatus for identifying supposedly cancerous cytologic preparations classifies cytologic preparations obtained in the course of mass preventive examination of the population (predominantly female population, for diagnosing the early stages of cancer of the cervix uteri) as normal and pathological (which may prove to be cancerous). Preparations are classified depending upon the number of atypical cells in a preparation.

The classification time is determined by the way a preparation is prepared and by a cell exposure rate (the rate of action of the cell detection device). In combination with the existing apparatus for cell detection and measurement, it is possible to identify as many as 50 cells per minute, or 30 preparations per hour.

The ratio between the hyper- and hypo-diagnostical errors may vary, if desired, for example, 10 and 1 percent, respectively, or 3 and 3 percent with 5 percent of preparations calling for a repeated analysis.

The proposed apparatus may be installed directly at cancer control centers and other preventive medical institutions for mass preventive examinations of population, in contrast to known apparatus which can only be used for research purposes.

What is claimed is:

1. An apparatus for identifying supposedly cancerous cytologic preparations with reference to an image of cells of these preparations, comprising: a means for generating signals carrying information about areas $S_i$ of said image of said cell of said cytologic preparation at preset levels $i$ of optical density of said image of that cell and about a serial number of levels, having a first output which provides a signal carrying information about said areas, and a second output which provides a signal carrying information about a serial number of these levels; a unit for classification of said cell as normal or atypical depending upon said areas of said cell measured at the present levels $i$ of optical density, applied whereto are said signals carrying information about said areas $S_i$ of said image of said cell of said cytologic preparation at the preset levels $i$ of optical density of said image of that cell and about a serial number of the levels; a pulse frequency divider of said unit for classification of said cell as normal or atypical, having a first input and a second input and an output; the first and the second inputs of said divider connected to the first and the second outputs of said means for generating said pulses carrying information about said areas $S_i$ of said image of said cell of said cytologic preparation at the preset levels $i$ of optical density of said image of that cell and about a serial number of the levels; said divider dividing the area $S_i$ of said image of said cell, measured at the preset level $i$ of optical density, by a weight division coefficient $a_i$ corresponding to that level; a reversible counter of said unit for classification of said cell as normal or atypical; having a counting input, reversal control inputs and digit outputs; said counting input of said reversible counter connected to said output of said divider; a unit for controlling said reversible counter, also incorporated into said unit for classification of said cell as normal or atypical, whose input is connected to the second output of said means for generating signals carrying information about said areas $S_i$ of said image of said cell of said cytologic preparation at the preset levels $i$ of optical density of said image of that cell and about a serial number of the levels; said reversal control inputs of said reversible counter connected to said unit for controlling said reversible counter, so that following the application to the input of that unit of a signal carrying information about a serial number of levels $i$ of optical density of said image of said cell from the second output of said means for generating said signals carrying information about said areas $S_i$ of said image of said cell of said cytologic preparation at the preset levels $i$ of optical density of said image of that cell and a serial number of levels, said unit for controlling said reversible counter switches, depending upon the serial number of the level of optical density, said reversible counter, which contains the sum of the weighed areas $$\sum_{i=1}^{n} \frac{S_i}{a_i},$$

obtained in the course of measurement of said areas $S_i$ of said image of said cell at all the preset levels $n$ of optical density; a decoding circuit of said unit for classification of said cell as normal or atypical, having code inputs, an interrogation bus, first and second outputs; said code inputs of said decoding circuit connected to said digit outputs of said reversible counter, whereas said interrogation bus is connected to said divider; said decoding circuit compares said sum of weighed areas with a limiting value A of that time for an atypical cell following the application to said interrogation bus of a signal indicative of the end of measurement of said areas $S_i$ of said image of said cell at all the preset levels $n$ of optical density; depending upon the sign of the difference $$\sum_{i=1}^{n} \frac{S_i}{a_i} - A$$

said decoding circuit classifies said cell as normal or atypical; a recording unit having two channels, the first thereof designed to count the number of atypical cells and connected to the second output of said decoding circuit, the second designed to count the total number of said cells and connected to the first output of the same decoding circuit.

2. The apparatus as claimed in claim 1, further comprising a unit for classification of said cytologic preparation as normal or pathological performed in the course of successive classification of cells of said preparation; said unit for classification having a group of inputs connected to the outputs of said first channel of said recording unit to represent the number of atypical cells and a separate input connected to the output of said second channel of said recording unit to represent the total number of classified cells; said unit for classification for comparing the number and the ratio of normal and atypical cells with a boundary value preset for a given localization of cancer to identify said preparation as a whole.

3. A method for the classification of supposedly cancerous cytologic preparations with reference to images of cells of these preparations, based upon converting a video signal obtained in the course of scanning of said images and processing information contained in said video signal representative of optical and geometrical parameters of said images, comprising the following steps:

discriminating a portion of said video signal representative of the image of a cell to be classified;

detecting the extreme black and white levels of said discriminated video signal;

converting said discriminated video signal into $n$ electrical signals each corresponding to one of $n$ preset levels of optical density within the limits of said detected extreme black and white levels;

measuring parameters of each of said $n$ electrical signals to provide information representative of optical and geometrical parameters of said image of said cell to be classified; and classifying said cell into a normal cell or an atypical cell depending upon the combination of said measured parameters representative of the optical and geometrical parameters of said image of said cell.

4. A method as claimed in claim 3, whereby the number of optical density levels of the image of said cell is six.

5. The method as claimed in claim 3 wherein said images of said cells of said preparation are successively scanned and said cells are successively classified until the number and the ratio of normal and atypical cells reaches a boundary value preset for a given localization of cancer.

6. A method as claimed in claim 5, whereby the number of optical density levels of the image of said cell is six.

* * * * *